(12) United States Patent
Croxford et al.

(10) Patent No.: US 11,347,060 B2
(45) Date of Patent: May 31, 2022

(54) DEVICE AND METHOD OF CONTROLLING DEVICE

(71) Applicant: Arm Limited, Cambridge (GB)

(72) Inventors: Daren Croxford, Swaffham Prior (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 94 days.

(21) Appl. No.: 16/700,375

(22) Filed: Dec. 2, 2019

(65) Prior Publication Data

US 2021/0165219 A1 Jun. 3, 2021

(51) Int. Cl.
*G02B 27/01* (2006.01)
*G02B 27/00* (2006.01)
*G06F 3/01* (2006.01)
*G06F 3/14* (2006.01)

(52) U.S. Cl.
CPC ..... *G02B 27/0172* (2013.01); *G02B 27/0093* (2013.01); *G06F 3/013* (2013.01); *G06F 3/017* (2013.01); *G06F 3/14* (2013.01); *G02B 2027/0138* (2013.01)

(58) Field of Classification Search
CPC ............ G02B 27/0172; G02B 27/0093; G02B 2027/0138; G02B 27/0081; G06F 3/017; G06F 3/14; G06F 3/013; G06F 3/1423; G06F 3/147; G09G 2300/023; G09G 2320/0626; G09G 2360/144; G09G 2320/0261
See application file for complete search history.

(56) References Cited

U.S. PATENT DOCUMENTS

| 2012/0019434 | A1* | 1/2012 | Kuhlman | G09G 3/36 345/1.3 |
| 2013/0162673 | A1* | 6/2013 | Bohn | G02B 27/0172 345/633 |
| 2015/0253573 | A1* | 9/2015 | Sako | G02B 27/0172 345/156 |
| 2017/0199604 | A1* | 7/2017 | Lin | G02F 1/13338 |
| 2018/0217429 | A1* | 8/2018 | Busch | G02F 1/076 |
| 2018/0335837 | A1 | 11/2018 | Bogusz et al. | |

OTHER PUBLICATIONS https://uploadvr.com/waveguides-smartglasses/.

* cited by examiner

*Primary Examiner* — Abhishek Sarma
(74) *Attorney, Agent, or Firm* — EIP US LLP

(57) ABSTRACT

A device comprising a first side for facing a user of the device, a second side opposite to the first side, a sensor operable to output gaze data representative of a gaze direction of the user, a display device and at least one processor. The at least one processor is configured to control the display device to control display of an image intended to be displayed on the second side of the device on the basis of the gaze data in order to reduce light being directed towards a pupil of the user from the first side of the device by the display of the image. Also described is a method of controlling such a device.

18 Claims, 4 Drawing Sheets

DEVICE AND METHOD OF CONTROLLING DEVICE

BACKGROUND OF THE INVENTION

Field of the Invention

The present invention relates to a device comprising a display device and a method of controlling a device comprising a display device.

Description of the Related Technology

A large number of electronic devices are capable of displaying visual content to a user, such as image, text or video content. Such display devices range from the relatively large, such as televisions, to the relatively small and portable, such as smartphones and smart watches. Known devices for displaying visual content to a user include head-mounted displays (HMDs). HMDs may be used for various purposes, including augmented reality (AR), mixed reality (MR) and virtual reality (VR) applications.

SUMMARY

According to a first aspect of the present disclosure, there is provided a device comprising: a first side for facing a user of the device; a second side opposite to the first side; a sensor operable to output gaze data representative of a gaze direction of the user; a display device; and at least one processor configured to control the display device to control display of an image intended to be displayed on the second side of the device on the basis of the gaze data in order to reduce light being directed towards a pupil of the user from the first side of the device by the display of the image.

According to a second aspect of the present disclosure, there is provided a method of controlling a device comprising a first side for facing a user of the device and a second side opposite to the first side, the method comprising: receiving gaze data representative of a gaze direction of the user; and controlling a display device of the device to control display of an image intended to be displayed on the second side of the device on the basis of the gaze data in order to reduce light being directed towards a pupil of the user from the first side of the device by the display of the image.

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
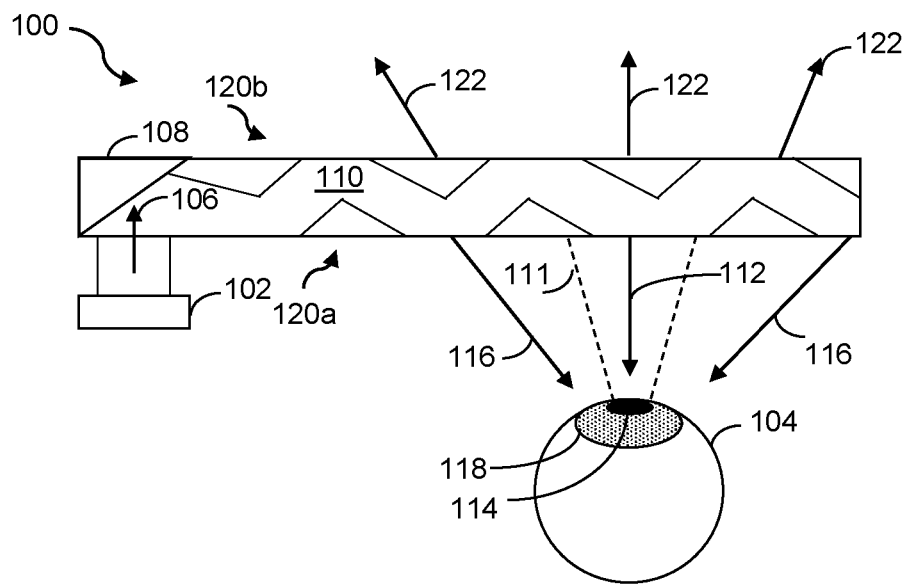
FIG. 1 is a schematic diagram illustrating use of a device according to examples herein.

FIG. 1 is a schematic diagram illustrating use of a device 100 according to examples. The device 100 includes a display device 102 for displaying an image. FIG. 1 shows part of the device 100, which in this example is a head-mounted display (HMD). A HMD is for example a device that is wearable on a user's head for displaying an image to the user. Although not shown in FIG. 1, it is to be appreciated that the device 100 may additionally include suitable mounting apparatus, such as a frame and/or strap, for mounting or otherwise coupling the device 100 to the user's head. For example, the part of the device 100 shown in FIG. 1 may be integrated in a headset, which may be in the form of a helmet or glasses. Such a headset may be monocular, with the part of the device 100 show in FIG. 1 arranged to project an image into one eye of the user, or binocular. Where the headset is a binocular headset, the headset may include one of the parts of the device 100 shown in FIG. 1 for each eye of the user, i.e. two of the parts shown in FIG. 1 in total. In other binocular headsets, however, the part of the device 100 shown in FIG. 1 may extend to cover both eyes of the user rather than a single eye 104 of the user as shown schematically in FIG. 1.

In the example of FIG. 1, light 106 emanating from the display device 102 during the display of the image is incident on a prism 108 which refracts the light 106 to direct the light 106 into a waveguide 110. The waveguide 110 guides the light towards the user's eye 104 so that the user can view the image displayed on the display device 102. Various different waveguides may be used as the waveguide 110 of FIG. 1. In some cases, the waveguide is a surface relief waveguide, which includes a plurality of micro-ridges. Light entering the waveguide is incident on a first set of micro-ridges, undergoes internal reflection and is guided along a length of the waveguide. A second set of micro-ridges reflect the light out of the waveguide. In other cases, the waveguide is a holographic waveguide, which includes a plurality of holographic reflective optical elements. A first set of holographic elements reflects incident light and guides the light along the waveguide until the light is incident on a second set of holographic elements, which reflect the light out of the waveguide. In either a surface relief or holographic waveguide, as the light is guided along the length of the waveguide, the light typically undergoes at least one internal reflection within the waveguide, which generally includes a reflective internal surface.

Light 112 incident on the pupil 114 of the user's eye 104 (and therefore visible to the user) is indicated in FIG. 1 with the arrow 112. The user therefore perceives the image corresponding to the light 112 that is incident on the user's pupil 114. The field of view (FOV) 111 of the user's eye 104 is shown schematically in FIG. 1 and corresponds to a region of space that the user can see using their eye 104.

Not all light emitted by the display device 102 and guided by the waveguide 110 may be incident on the user's pupil 114, however. In the example of FIG. 1, light 116 that is guided towards the user by the waveguide 110 but that is not incident on the user's pupil 114 is shown in FIG. 1 with the arrow 116. The light 116 in the example of FIG. 1 is directed towards the iris 118 of the user's eye. The light 116 may also be incident on other parts of the user and/or other objects on the same side of the device 100 as the user. The parts of the image corresponding to the light 116 that does not impinge on the user's pupil 114 are not visible to the user.

In FIG. 1, the device 100 has a first side 120*a* for facing the user of the device 100 and a second side 120*b* opposite to the first side 120*a*. The second side 120*b* faces away from the user of the device 100 in this case. In FIG. 1, the waveguide 110 also guides some of the light 106 emanating from the display device 102 in a direction away from the user. In this case, some light 122 therefore also emanates from the second side 120*b* of the device 100. This means that at least some of the light 106 emitted by the display device 102 is visible on the second side 120*b* of the device 100. This for example occurs due to imperfect reflection of light at an interface between the waveguide 110 and an ambient environment. When light is incident on this interface, a portion of the light is reflected back into the waveguide 110 and another portion is transmitted into the ambient environment. If this occurs at the interface between the waveguide 110 and the ambient environment at the second side 120*b* of the device 100, the transmitted portion of light 122 will propagate into the ambient environment on the second side 120*b* of the device 100. Such light 122 will be visible to a bystander located on the second side 120*b* of the device 100 provided the light 122 is within the bystander's field of view and is of sufficient intensity to be perceivable by the visual system of the bystander. In this way, the bystander on the second side 120*b* of the device 100 may be able to at least partly view an image intended to be visible to the user on the first side 120*a* of the device 100. For example, the bystander may be able to perceive a color of the image displayed on the first side 120*a* of the device 100 or may be able to see at least part of the image displayed on the first side 120*a* of the device 100.

Figure 2:
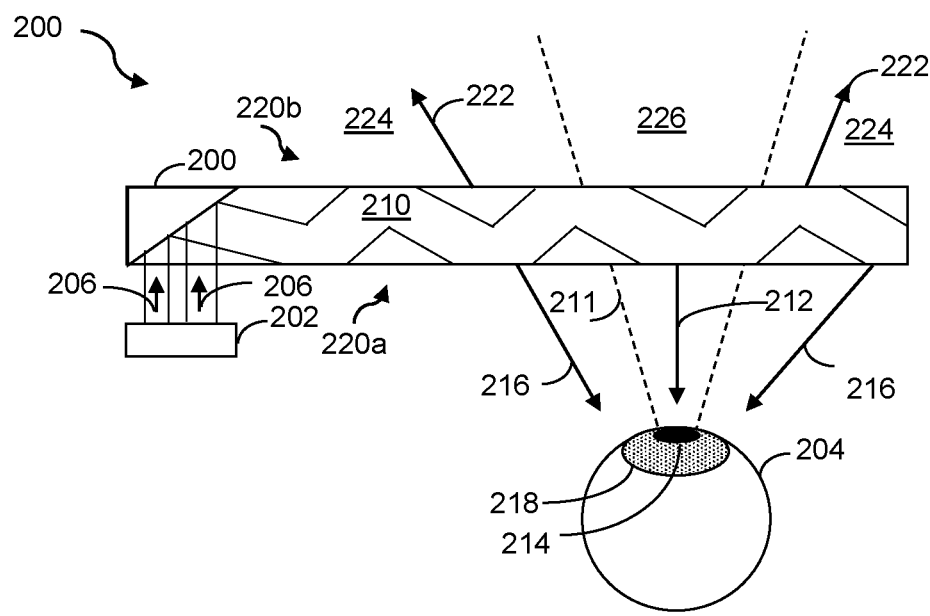
FIG. 2 is a schematic diagram illustrating use of a device according to further examples herein.

FIG. 2 is a schematic diagram illustrating use of a device 200 according to further examples herein. The device 200 is similar to the device 100 of FIG. 1 and includes similar components. As in FIG. 1, FIG. 2 illustrates part of the device 200. It is to be appreciated that the device 200 may include further components not shown in FIG. 2, e.g. to mount the device 200 on a user's head, where the device 200 is an HMD. Features of FIG. 2 that are the same as corresponding features of FIG. 1 are labelled with the same reference numeral but incremented by 100; corresponding descriptions are to be taken to apply. The device 200 of FIG. 2 is merely an example, it is to be appreciated that other devices may be configured to implement the concepts described herein, such as devices based on other display technologies, such as other types of transmissive display technology.

In FIG. 2, the device 200 is being controlled to display an image intended to be displayed on the second side 220*b* of the device 200. In other words, rather than using the device 200 to display an image to the user of the device 200 (on the first side 220*a* of the device 200), the device 200 is instead being used in FIG. 2 to display an image on the second side 220*b* of the device 200. For example, the image may be displayed on the second side 220*b* of the device 200 such that the image is visible to a bystander on the second side 220*b* of the device 200. The image may be more visible to the bystander than to the user of the device 200.

Using the device 200 as shown in FIG. 2 to display an image intended to be displayed on the second side 220*b* of the device 200 improves the flexibility of the device 200. For example, at a first time, the device 200 may be controlled similarly to the device 100 of FIG. 1, to display an image on the first side 220*a* of the device 200. At a second time, the device 200 may however be controlled as shown in FIG. 2, to instead display an image on the second side 220*b* of the device 200. This allows the device 200 to flexibly display images on either the first or second sides 220*a*, 220*b*. In this way, the functionality of the device 200 is improved, as the device 200 provides additional options for display of images. As an example, a user may operate the device 200 as shown in FIG. 2 to display a particular display effect or image to bystanders. For example, the device 200 may be controlled so that a particular color or image is visible to an external observer located on the second side 220*a* of the device 200. Use of the device 200 may also or instead improve the user's privacy. For example, by displaying an image on the second side 220*a* of the device 200, the user's eye may be less visible to bystanders. This may be desirable where a user wishes to conceal their eye or a region of their face behind the device 200.

In the example of FIG. 2, the device 200 includes a sensor operable to output gaze data representative of a gaze direction of the user. In examples, such as that of FIG. 2, the gaze direction corresponds to a direction in which the user's eye 204 is looking or is focusing on. The gaze data may be obtained using an eye-tracking sensor. An eye-tracking sensor may be arranged in the device 200, for example. In such cases, the gaze data is obtained either directly or indirectly from an eye-tracking mechanism. In some cases, such as that of FIG. 2, the device 200 is operable to display a rendered image generated using a graphics processing pipeline. In this case, the device 200 includes an eye-tracking sensor to reduce graphics processing requirements. For example, the eye-tracking sensor may be used during so-called "foveated rendering" to reduce the image quality of the rendered image in a peripheral region of the user's vision, outside the user's fovea. Hence, in these cases, the gaze data may be obtained efficiently using an eye-tracking sensor of the device which is already present for other purposes. In other examples, though, the gaze data is not obtained using an eye-tracking mechanism. For example, the gaze data may instead be obtained using a head-tracking mechanism. The gaze data may include data indicating a region of space a viewer is looking at and/or is predicted to be looking at.

At least one processor of the device 200 is configured to control the display device 202 to control display of an image intended to be displayed on the second side 220*b* of the device 200 on the basis of the gaze data in order to reduce light being directed towards the pupil 214 of the user from the first side 220*a* of the device 200 by the display of the image. Internal components of the device 200 (including the at least one processor) are discussed further with reference to FIG. 6. In FIG. 2, the display device 202 is controlled to display the image intended to be displayed on the second side 220*b* of the device 200 using appropriate pixels to reduce light being directed towards the pupil 214 of the user. Light 206 emitted from these pixels is guided through the device 200 using the waveguide 210 and emanates from the waveguide 210 such that light directed towards the user's pupil 214, e.g. within the user's field of view 211, is limited. In other words, the waveguide 210 is configured to receive light emitted from the display device 202 during the display of the image and guide the light 206 emitted from the display device 202 such that the image is displayed on the second side 220b of the device 200. In this way, the display of the image may be controlled such that a first amount of light 212 directed towards the pupil 214 of the user from the first side 220a of the device 200 by the display of the image is less than a second amount of light 222 emanating from the second side 220a of the device 200. Additionally or alternatively, the display of the image may be controlled such that a first amount of light 212 directed towards the pupil 214 of the user from the first side 220a of the device 200 by the display of the image is less than a further amount of light directed away from the pupil 214 of the user from the first side 220a of the device 200 by the display of the image. In some cases, a smaller amount of light may be within the user's FOV 211 on the first side 220a of the device 200 than outside the user's FOV 211, e.g. on the second side 220b of the device 200 and/or on the first side 220a of the device 200 but outside the user's FOV 211. In this way, the image may be less visible to the user than to an observer on the second side 220b of the device 200.

In some cases, the display device 202 is controlled such that the image intended to be displayed on the second side 220b of the device 200 is invisible or substantially invisible to the user of the device 200. For example, the image intended to be displayed on the second side 220b of the device may be sufficiently invisible to the user that the user's pupil 214 does not naturally focus on the image or so that the user does not perceive the presence of the image. In this way, the device 200 may be controlled to display the image externally (i.e. on the second side 220b of the device 200), without displaying the image internally (i.e. on the first side 220a of the device 200).

In some examples, the waveguide 210 is at least partially transparent. In such cases, the device 200 may be used as an AR device 200, in which an image displayed by the display device 202 (which is typically a computer-generated image, which may be referred to as a virtual image) is superimposed on the user's view of the real world. In this case, the displayed image obscures part of the environment in the user's vision (if the image is intended to be visible to the user on the first side 220a of the device 200). However, the remainder of the environment is at least partially visible to the user, through the at least partially transparent waveguide 210 of the device 200. In examples in accordance with FIG. 2, however, the image is not intended to be visible to the user of the device 200. Instead, the image is intended to be displayed on the second side 220b of the device 200. However, in examples in which the waveguide 210 is at least partially transparent, the user is able to view the real world through the at least partially transparent waveguide 210. In other words, the environment is visible to the user at the first side 220a of the device 200 within the user's FOV 211, as the environment is not obscured by the display of the image or is obscured to a lesser extent. Instead, the image is displayed to reduce the light being directed towards the pupil 214 of the user from the first side 220a of the device. In this way, the image can be displayed on the second side 220b of the device 200 with reduced distraction to the user of the device 200. For example, if the image is substantially invisible to the user, the user may have an unfettered view of the environment, while simultaneously using the device 200 to display the image so it is visible on the second side 220b of the device 200.

By reducing the first amount of light 212 directed towards the user's pupil 214, the image may be displayed to a greater extent on a first region 224 of the second side 220b of the device 200 which is outside a second region 226 of the second side 220b corresponding to the user's field of view 211. This is indicated schematically in FIG. 2 by a lack of light emanating from the second region 226 of the second side 220b of the device 200. However, it is to be appreciated that, in other examples, some light may nevertheless be emitted from the second region 226 but the amount of such light may be less than the amount of light emanating from the first region 224. Despite a lesser amount of light emanating from the second region 226, the image displayed on the second side 220b of the device 200 may nevertheless appear to an observer located on the second side 220b of the device 200 to extend across the first and second regions 224, 226, e.g. if the first region 224 is sufficiently small compared to the second region 226. This may improve the quality of the image as perceived by the observer. For example, where the image is a block of a single color, the block of the single color may appear to occupy the entire second side 220b of the device 200.

Figure 3A:
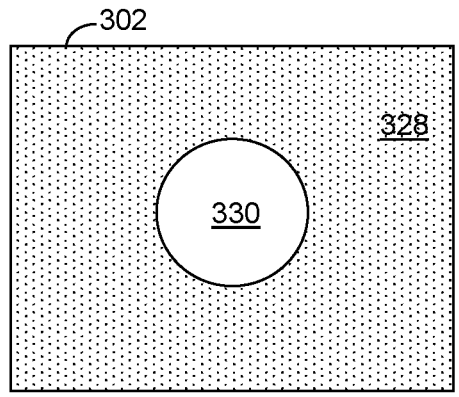
FIGS. 3a and 3b are schematic diagrams illustrating display of an image using a display device according to examples herein.
Figure 3B:
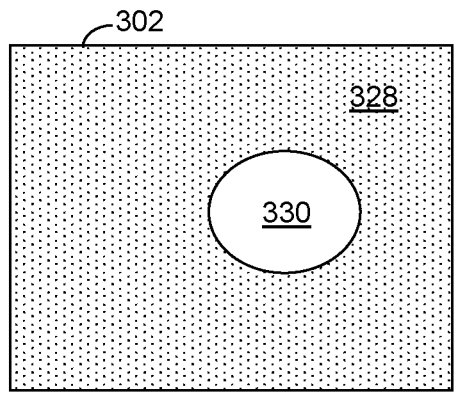

FIGS. 3a and 3b are schematic diagrams illustrating display of an image using a display device 302, which is similar to the display devices 102, 202 of FIGS. 1 and 2 and is comprised in a device (not shown in FIGS. 3a and 3b) similar to the devices 100, 200 of FIGS. 1 and 2. In examples in accordance with FIGS. 3a and 3b, the at least one processor of the device comprising the display device 302 is configured to identify, based on gaze data (such as that described with reference to FIG. 2), a first plurality of pixels 328 of the display device 302 for displaying an image intended to be displayed on the second side of the device in order to reduce the light being directed towards the pupil of the user from the first side of the device by the display of the image. The first plurality of pixels 328 is shown schematically in FIG. 3a and corresponds to pixels that, when used to display the image, emanate light which is directed away from the user's pupil, towards the second side of the device (e.g. after being guided by a waveguide of the device). The display device 302 of FIG. 3a is controlled to display the image using the first plurality of pixels 328 without using a second plurality of pixels 330 of the display device 302, different from the first plurality of pixels 328. The second plurality of pixels 330 of the display device 302 in this case corresponds to pixels that, when used to display an image, emanate light which would be directed towards the user's pupil on the first side of the device. Hence, by displaying the image without use of the second plurality of pixels 330, light incident on the user's pupil is reduced compared to that which would be incident on the user's pupil if the second plurality of pixels 330 were used.

Displaying an image using the first plurality of pixels 328 without using a second plurality of pixels 330 may involve controlling a brightness of the first plurality of pixels 328 such that it is greater than that of the second plurality of pixels 330. For example, during display of the image, the second plurality of pixels 330 may be in a dark (or "OFF") display state and may therefore emit no light or substantially no light, such as no light within measurement uncertainties. The first plurality of pixels 328 are, in the example of FIG. 3a, controlled using image data representing the image intended to be displayed on the second side of the device, so as to provide a display effect on the second side of the device that would be perceived as the image by an observer at the second side of the device. It is to be appreciated that, where the device comprising the display device 302 includes a waveguide, the light emitted by the display device 302 is typically modulated to some extent due to propagation through the waveguide. In view of such modulation, the image as displayed by the display device 302 (e.g. if viewed by a direct observer of the display device 302) may differ from the image as displayed on the second side of the device (after propagation of the light emitted by the display device 302 through the waveguide). In such cases, the display device 302 may be controlled appropriately so that the image displayed on the second side of the device corresponds to a desired image as perceived by a viewer on the second side of the device (even though the image as displayed by the display device 302 itself, before propagation of the emitted light through the waveguide, may differ from the image displayed on the second side of the device).

The user of the device may change the direction of their gaze as they use the device, e.g. to observe changes in an environment surrounding them. To compensate for this, the at least one processor may be configured to determine a change in the gaze direction of the user and, in response to the change in the gaze direction, select a different plurality of pixels of the display device as the first plurality of pixels 328. The different plurality of pixels may at least partly overlap the previous plurality of pixels of the first plurality of pixels 328 or may be entirely non-overlapping. For example, a different location, number and/or pattern of pixels may be selected as the first plurality of pixels. The selection of a different plurality of pixels as the first plurality of pixels 328, in response to the change in gaze direction, is shown schematically in FIG. 3b, which shows the display device 302 of FIG. 3a after the gaze direction of the user has changed. The user's gaze direction has moved to the right from FIG. 3a to FIG. 3b (in the sense of FIGS. 3a and 3b), and the user's FOV has also changed. In response to this change, the first plurality of pixels 328 used to display the image intended to be displayed on the second side of the display device has correspondingly changed, and has moved to the right in FIG. 3b. In addition, due to the change in the shape of the user's FOV, the shape of the first plurality of pixels 330a has also changed from FIG. 3a to FIG. 3b. It is to be appreciated that the number and/or pattern of pixels of the second plurality of pixels 330 may correspondingly change due to a change in the number and/or pattern of pixels of the first plurality of pixels 328. Hence, due to the change in the shape of the first plurality of pixels 330a from FIG. 3a to FIG. 3b, a shape of the second plurality of pixels 330 has changed from a circular shape in FIG. 3a to an oval shape in FIG. 3b.

By changing the pixels selected as the first plurality of pixels in response to the change in the gaze direction, the reduction in the amount of light being directed towards the pupil of the user from the first side of the device by the display of the image may be maintained, despite a change in the gaze direction of the user. This may further reduce distractions to the user of the device by the display of the image, e.g. by allowing the image to remain less visible or substantially invisible to the user on the first side of the device, while remaining visible on the second side of the device.

Figure 4A:
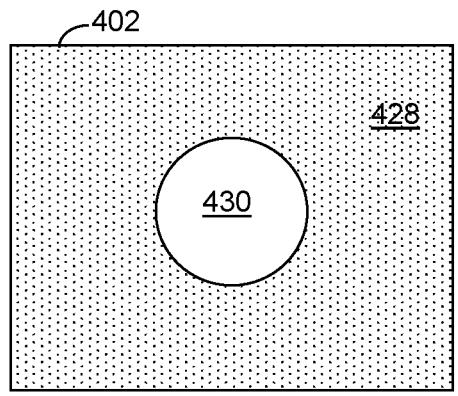
FIGS. 4a and 4b are schematic diagrams illustrating display of an image using a display device according to further examples herein.
Figure 4B:
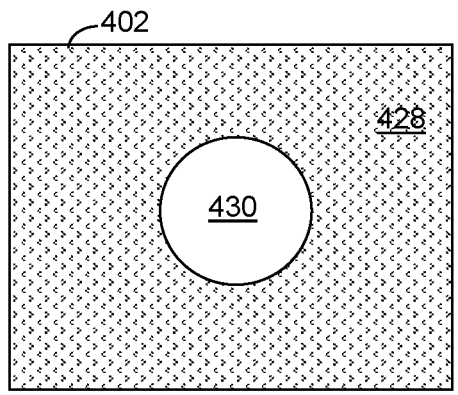

FIGS. 4a and 4b are schematic diagrams illustrating display of an image using a display device 402 according to further examples. The display device 402 is comprised in a device (not shown in FIGS. 4a and 4b) similar to the devices 100, 200 of FIGS. 1 and 2. Features of FIGS. 4a and 4b which are similar to corresponding features of FIGS. 3a and 3b are labelled with the same reference numerals but incremented by 100; corresponding descriptions are to be taken to apply.

FIG. 4a shows the display of an image intended to be displayed on a second side of the device using a first plurality of pixels 428 without using a second plurality of pixels 420, as shown in FIG. 3a. However, rather than selecting a different plurality of pixels as the first plurality of pixels in response to a change in gaze direction, FIG. 4b shows that, in some cases, the image displayed using the first plurality of pixels 428 may change over time. For example, the display device 402 may be controlled to cease displaying the image of FIG. 4a and to display a different image intended to be displayed on the second side of the device, as shown in FIG. 4b. This further improves the flexibility of the device, as it may be used to display time-varying images, as discussed further with reference to FIG. 6. Features of FIGS. 3 and 4 may be combined. For example, a different plurality of pixels may be selected as the first plurality of pixels in addition to displaying a different image on the second side of the device, e.g. simultaneously.

Figure 5A:
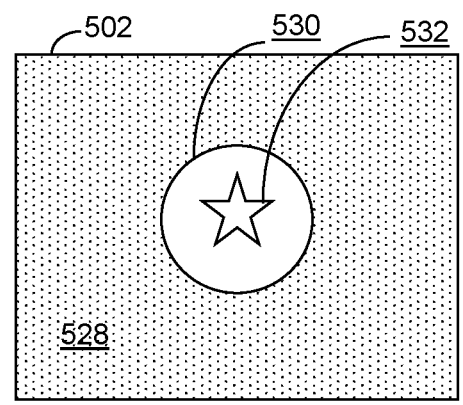
FIGS. 5a and 5b are schematic diagrams illustrating display of an image using a display device according to yet further examples herein.
Figure 5B:
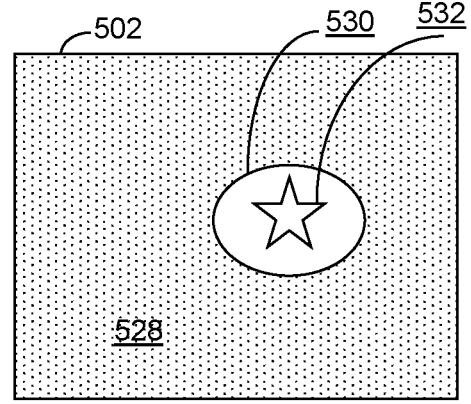

FIGS. 5a and 5b are schematic diagrams illustrating display of an image using a display device 502 according to further examples. The display device 402 is comprised in a device (not shown in FIGS. 4a and 4b) similar to the devices 100, 200 of FIGS. 1 and 2. Features of FIGS. 5a and 5b which are similar to corresponding features of FIGS. 3a and 3b are labelled with the same reference numerals but incremented by 200; corresponding descriptions are to be taken to apply.

In the examples of FIGS. 3a, 3b, 4a and 4b, the second plurality of pixels 330, 430 are not used to display an image, and may instead be in an "OFF" state. In other cases, though, the image intended to be displayed on the second side of the device is a first image and the device is configured to control the display device 502 to control display of a second image intended to be displayed on the first side of the device on the basis of the gaze data. FIGS. 5a and 5b illustrate such an example schematically.

In the example of FIGS. 5a and 5b, the functionality of the device is further enhanced. The device is used to display two different images on opposite sides of the device, and to different observers. In this way, the first side of the device may be used to display an AR or MR image to the user of the device as the second image, while also displaying the first image to observers on the second side of the device. This may further enhance the user's privacy. For example, a portion of light corresponding to the second image intended to be displayed on the first side of the device may nevertheless be emitted at the second side of the device during display of the second image. However, despite this portion of light emanating from the second side of the device, the second image may be less visible at the second side of the device than otherwise, due to the simultaneous display of the first image at the second side of the device. For example, this portion of light may have a lesser intensity than the light for display of the first image of the second side of the device. This portion of light may therefore be less noticeable e.g. than if no image were displayed at the second side of the device. In this way, the second image intended to be displayed on the first side of the device may not be perceivable to an observer at the second side of the device. This may improve the privacy of the device, e.g. by allowing the user to view private information as the second image, without such private information being visible to an observer at the second side of the device.

In examples such as FIGS. 5a and 5b, the at least one processor of the device is configured to identify, based on the gaze data, a first plurality of pixels 528 of the display device 502 for displaying the first image in order to reduce the light being directed towards the pupil of the user from the first side of the device by the display of the first image and a second plurality of pixels 530 of the display device 502 for displaying the second image 532 on the first side of the device. The display device 502 is then controlled to display the first image using the first plurality of pixels 528 of the display device 502 and display the second image 532 using at least some of the second plurality of pixels 530 of the display device 502. This is shown in FIG. 5a, in which the second image 532 is a computer-generated image of a star, e.g. generated by the device comprising, which is displayed to the user on the first side of the device. In this case, the second image 532 is an AR image, which is superimposed on the user's real-world view of the environment through an at least partially transparent waveguide of the device. The user therefore views the second image 532 in front of the environment, obscuring part of the environment. The second image 532 is displayed using a subset of the pixels of the second plurality of pixels 530 in this example. Nevertheless, in other examples, the second image 532 may be displayed using an entirety of the second plurality of pixels 530, e.g. if it is desired to fill an entirety of the FOV of the user's eye. The second plurality of pixels 530 in this case corresponds to the FOV of the user's eye, within which an AR image visible to the user is displayable. The first plurality of pixels 528 in this case is for displaying the first image outside the FOV of the user's eye and can therefore be used to display the first image on the second side of the device.

FIG. 5b illustrates that, similarly to FIG. 3b, the plurality of pixels selected as the first plurality of pixels 528, e.g. the location, number and/or pattern of pixels selected as the first plurality of pixels 530, may change over time. In FIG. 5b, the at least one processor has determined that the gaze direction of the user has changed. In response to this determination, the plurality of pixels selected as the first and second pixels 528, 530 has consequently changed, to maintain display of the second image 532 such that the second image 532 is visible to the user and to maintain a reduction in light directed towards the user's pupil by display of the first image on the second side of the device.

Figure 6:
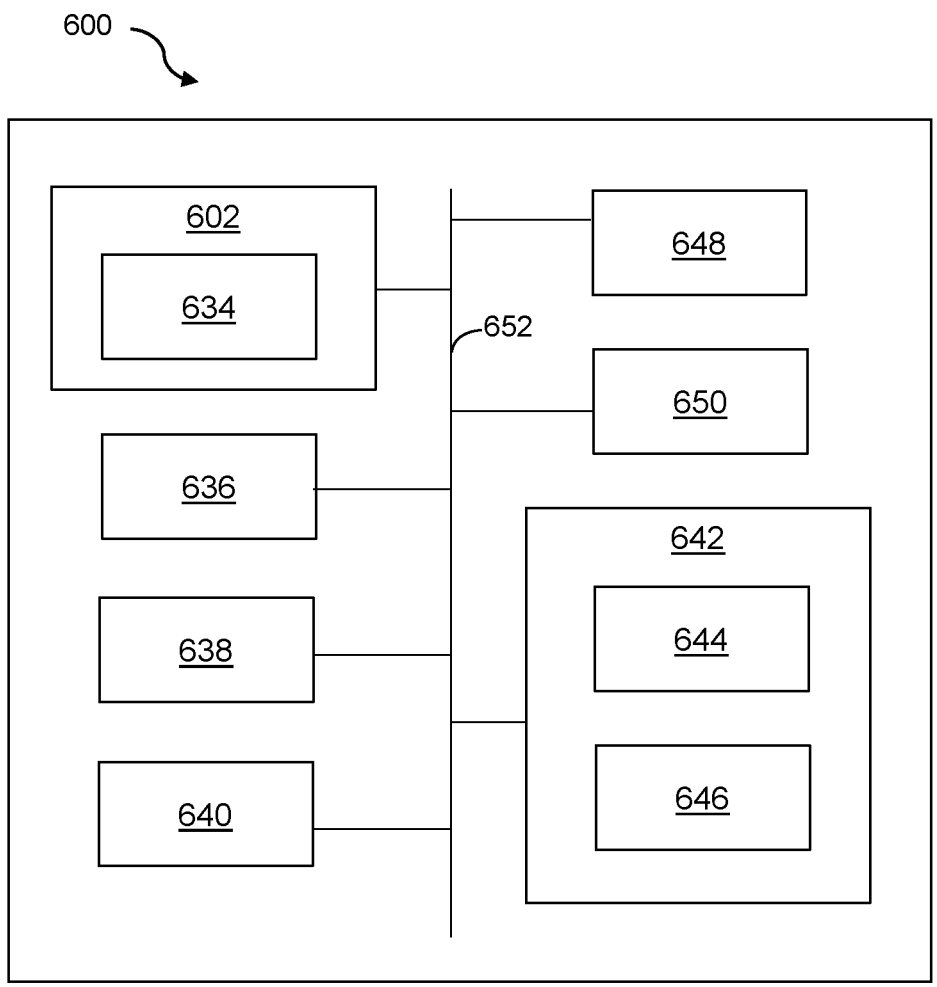
FIG. 6 is a schematic diagram illustrating internal components of a device according to examples herein.

FIG. 6 is a schematic diagram illustrating internal components of a device 600 according to examples herein. The device 600 may be used as the devices 100, 200 of FIGS. 1 and 2, for example, and includes a display device 602. In the example of FIG. 6, the device 600 is a HMD. However, in other examples, a device with components similar to or the same as the device 600 of FIG. 6 may be a different type of device including or coupled to a display device, such as a television or other monitor, or a computing device such as a smartphone, tablet or game console.

In the example of FIG. 6, the display device 602 is a transmissive display device including a backlight 634, such as liquid crystal display (LCD) device, an electrowetting display device or an electrophoretic display device. In other cases, though, a device similar to the device 600 of FIG. 6 may include a transflective display device including a backlight, or a display device without a backlight, such as a display device in which pixels or picture elements of the display device generate light, e.g. an organic light emitting diode (OLED) display device or a plasma display device.

The device 600 includes at least one processor 636. The at least one processor 636 is configured to control the display device 602 and may additionally be configured to perform other processing and/or controlling functions. Components of the at least one processor 636 may be communicatively coupled via at least one bus, which may have a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the at least one processor 636 comprises computer-useable volatile and/or non-volatile memory configured to store information and/or instructions for the processor components, which may be considered to correspond to local storage of the at least one processor 636. The computer-useable volatile and/or non-volatile memory may be coupled with the bus. The computer-useable memory may comprise random access memory (RAM) and/or read-only memory (ROM).

The device 600 also includes storage 638 for storing various data. For example, the storage 638 may be configured to store image data representing an image to be displayed, such as an image intended to be displayed on the first and/or second side of the device 600. For example, the storage 638 may store first image data representing a first image intended to be displayed on the second side of the device 600, which is opposite to a first side of the device 600 for facing a user. The storage 638 may additionally or alternatively store second image data representing a second image intended to be displayed on the first side of the device 600. The image data stored in the storage 638 may be received from a processor (such as a graphics processing unit (GPU) of the at least one processor 636 or of a further computer system) or from further storage, such as storage external to the device 600. The storage 638 may be a RAM such as DDR-SDRAM (double data rate synchronous dynamic random access memory). In other examples, the storage 638 may be or include a non-volatile memory such as a ROM, non-volatile memory (NVRAM) or a solid state drive (SSD) such as Flash memory. The storage 638 in examples includes further storage devices. The storage 638 may be removable or non-removable from the device 600. Access to the storage 638 may be controlled by a dynamic memory controller (DMC), not shown in FIG. 6.

The device 600 includes a sensor operable to output gaze data, which in the example of FIG. 6 is an eye-tracking sensor 640. In this case, the eye-tracking sensor 640 forms part of the device 600. However, in other examples, the eye-tracking sensor 640 is separate from the device 600. For example, the eye-tracking sensor 640 may be mountable to, but removable from, the device 600.

In the example of FIG. 6, the device 600 includes at least one further sensor 642 configured to obtain environmental data representative of at least one feature of an environment of the device 600. The environment for example refers to surroundings in which the device 600 is operating. A feature of the environment for example refers to a characteristic of the environment, e.g. which is observable, measurable and/or quantifiable. The at least one processor 636 in FIG. 6 is configured to control the device 600 to control the display of the image intended to be displayed on the second side of the device 600 based on the environmental data. In this way, an appropriate image may be displayed for the environment.

This further improves the utility of the device 600. For example, the at least one processor 636 may control the device 600 to appropriately adapt the display of the image based on a change in the environment. In other cases, though, control of a device similar to or the same as the device 600 of FIG. 6 may not depend on an environment in which the device 600 is located.

Moreover, by controlling the device 600 using the environmental data, the device 600 may be controlled more precisely than otherwise. For example, properties of the image intended to be displayed on the second side of the device 600 can be finely tuned based on the environmental data. This can improve the display of the image on the second side of the device 600 in a straightforward manner. For example, the control of the display of the image may be performed rapidly, based on the environmental data, so that the image is adapted in a correspondingly rapid manner to changes in the surrounding environment.

As an example, a dynamic range of the display device 602, an intensity of the backlight 634 of the display device 602 and/or a color profile of the display device 602 can be controlled based on the environmental data. The dynamic range of the display device 602 for example refers to a ratio between the brightest and darkest intensities of light displayable by the display device 602. The dynamic range may be controlled by controlling the intensity of the backlight 634 in the example of FIG. 6, in which the display device 602 includes the backlight 634. In other examples, in which the display device is an emissive device without a backlight, the dynamic range of the display device 602 may instead be adjusted by adjusting the luminance or intensity of each of the pixels (e.g. to adjust the luminance corresponding to the brightest and darkest gray levels displayable). This may involve changing a distance between gray levels in a luminance space. For example, if the dynamic range is increased but the number of gray levels remains unchanged, a distance between neighboring gray levels in the luminance space increases. A color profile of the display device 602 for example refers to data characterizing the color properties of the display device 602, and may be in the form of an ICC profile. A color profile typically defines a mapping between a color space associated with the display device 602 and another color space, which is generally referred to as a profile connection space (PCS), e.g. the CIELAB or CIEXYZ color spaces.

In further examples, a color characteristic of the image is additionally or alternatively controlled based on the environmental data. A color characteristic for example refers to a color appearance parameter of the image, such as a hue, lightness, brightness, chroma, colorfulness and/or saturation of the image. Hue refers to the degree of similarity between a stimulus, and stimuli that are described, respectively, as red, green, blue and yellow. Lightness, sometimes referred to as tone or luminance, refers to the perception of a relative brightness of a color, whereas brightness refers to a perception of an absolute luminance. Chroma refers to the colorfulness of an area as a proportion of a brightness of a similarly illuminated area that appears white. Colorfulness refers to perceived chromatic nature of a color. Saturation refers to the colorfulness of an area judged in proportion to its brightness. Chroma, colorfulness and saturation are based on perception of color attributes and therefore cannot be directly measured but can be quantified based on scales intended to be perceptually even. In some cases, controlling the color characteristic of the image may involve changing a tint or a shade of the image. A tint represents an extent to which the colors of the image are mixed with white and a shade represents an extent to which the colors of the image are mixed with black. Hence, increasing the tint of an image involves increasing the amount of white in the colors of the image and increasing the shade of the image involves increasing the amount of black in the colors of the image. In some cases, the image intended to be displayed on the second side of the device 600 may have a graduated color, such as a graduated tint or shade, with a characteristic of the color, e.g. the tint or shade, increasing or decreasing e.g. from one edge of the second side of the device to the other. In one example, the tint decreases from a bottom edge to a top edge of the device 600, with the device 600 in a predetermined orientation for use by the user. The amount of white in the colors of the image in this case therefore decreases from the bottom to the top edge of the device 600.

In examples, the at least one processor 636 is configured to control the display device 602 to control the display of the image such that at least one property of the image intended to be displayed on the second side of the device 600 is time-varying. For example, at least one of the above-discussed properties of the display device 602 and/or image may be changed over time, including the dynamic range, color profile and/or backlight intensity of the display device 602 and/or a color profile of the image. In this way, the display device 602 may provide a dynamic display effect. For example, a color characteristic of the image, such as the tint or hue of the image, and/or the amount of light directed towards a user or away from the user (e.g. emanating from the second side of the device 600) may be adjusted over time. The at least one property may be changed based on environmental factors, as represented by the environmental data. In this way, the device 600 may display an image intended to be displayed on the second side of the device 600 with appropriate properties for a given environment. This may improve the display quality of the image.

In some cases, part of the image intended to be displayed on the second side of the device 600 is time-varying and another part of the image remains unchanged over at least a period of time. For example, a property, e.g. a color characteristic, of part of the image corresponding to an iris of the user's eye may be time-varying. For example, the part of the image as displayed on the second side of the device 600 may appear to a viewer on the second side of the device 600 to at least partly overlap the user's iris, with the user using the device 600. The part of the image corresponding to the user's iris (and the pixels of the display device 602 for displaying the part of the image) may be determined by using the gaze data to determine a location of the user's pupil. The iris may then be taken as a region of a predetermined size around the user's pupil. Alternatively, the location of the user's iris may be determined using an observation of the user's eye, e.g. as captured by a camera of the device 600 directed towards the user during use of the device 600. In such cases, another part of the image which, as displayed on the second side of the device 600, does not overlap the user's iris or the user's pupil, may not change over at least a period of time, during changing of the part of the image that corresponds to the user's iris. In other cases, the size and/or shape of the part of the image that changes over time may itself change over time. For example, both a color characteristic and a shape of the part of the image that corresponds to the user's iris may change over time. For example, at a first time, the part of the image as displayed on the second side of the device 600 may appear to a viewer on the second side of the device 600 to overlap a first portion of the user's iris. At a second, different, time, however, the part of the image as displayed on the second side of the device 600 may appear to a viewer on the second side of the device 600 to overlap a second portion of the user's iris, which is larger than the first portion of the user's iris, and may be a different color than at the first time.

Referring back to FIG. 6, in this case, the at least one further sensor 642 includes a photosensor 644 and a camera 646. A photosensor 644 typically includes an array of sensor pixels for detecting light. A typical sensor pixel includes a photosensitive element such as a photodiode that can convert incident light into electronic signals or data. The sensor pixel may for example be a charge-coupled device (CCD) or a complementary metal-oxide-semiconductor (CMOS). In this way, the photosensor 644 can detect a luminance of ambient light, which is for example the light within the environment. Luminance is a photometric measure of the luminous intensity of light traversing a unit area, and is related to the brightness of the environment (where brightness is the subjective perception of the luminance to an observer). In such cases, the environmental data includes a representation of the luminance of the ambient light detected by the photosensor 644.

In examples such as this, the display of the image intended to be displayed on the second side of the device 600 can be controlled in dependence on the luminance of the ambient light. For example, at least one of the above-discussed properties of the display device 602 (such as a dynamic range, backlight intensity and/or color profile of the display device 602) and/or a color characteristic of the image can be controlled based on the luminance of the ambient light. This can improve the quality of the image intended to be displayed on the second side of the device 600 and/or reduce power consumption of the device 600. For example, in very light conditions, with high luminance ambient light, the backlight intensity may be increased so that the visibility of the image is increased. Conversely, the backlight intensity may be decreased in low light conditions, in which the image is visible without a high intensity backlight, to reduce power consumption. In the same way, color characteristics of the image may be appropriately adjusted based on the luminance of the ambient light to improve the display quality of the image, e.g. to make the image more visible or sharper to an observer located on the second side of the device 600.

In the example of FIG. 6, the device 600 also includes a polarizing filter 648. The at least one processor 636 is configured to control the polarizing filter 648 to selectively filter light emitted by the display device 602 during the display of the image intended to be displayed on the second side of the device 600, based on the environmental data. Light emitted by the display device 602 may be selectively filtered for various reasons. In one case, the light is filtered where it is desired to display a dark image to the user of the device 600, on the first side of the device 600, with the dark image superimposed on an environment which is relatively bright. If the display device 602 is transmissive, the polarizing filter 648 may be controlled to selectively filter light to reduce the amount of light transferred across the device 600. This makes the external environment appear darker to the user, so that the dark image is more clearly visible to the user. In other cases, the polarizing filter 648 may be controlled to selectively filter light to improve the display of the image intended to be displayed on the second side of the display 600 instead of or in addition to improving the display of an image intended to be displayed on the first side of the display 600.

The polarizing filter 648 is for example located in front of the display device 602, such that the light emitted from the display device 602 impinges on the polarizing filter 648 before reaching an intended viewer. The polarizing filter 648 selectively filters light impinging on the polarizing filter 648 depending on the polarization state of the light. For example, if the light includes horizontally and vertically polarized light, the polarization filter 648 may filter the horizontally polarized light (e.g. by absorbing the horizontally polarized light), while allowing the vertically polarized light to be transmitted therethrough. The polarizing filter 648 is controllable to control which polarization state of light the polarizing filter 648 selectively filters and which polarization state of light the polarizing filter 648 transmits. For example, the polarizing filter 648 may be controllable to switch the polarizing filter 648 from filtering horizontally polarized light to filtering vertically polarized light, or from filtering left-handed circularly polarized light to filtering right-handed circularly polarized light. By controlling the light selectively filtered by the polarizing filter 648, the amount of light directed towards the user and/or the second side of the device 600 can in turn be controlled. Such control may be performed based on the environmental data, to provide further flexibility for control of the device 600. This may improve display of the image in varying environmental conditions. For example, this control may be based on a luminance of ambient light, e.g. to control the amount of light for display of the image intended to be displayed on the second side of the device 600. This can enhance the visibility of the image under different lighting conditions. The polarizing filter 648 may be controlled on a region-by-region basis or for the entire display. For example, the polarizing filter 648 may filter the same polarization state of light across the entire display device 602, or may be arranged to filter different polarization states of light received from different respective regions of the display device 602.

In other cases, the polarizing filter may not be adjustable. In such cases, the amount of light for display of the image intended to be displayed on the second side of the device 600 may instead be controlled by controlling an output polarization characteristic of the display device 602, e.g. based on the environmental data. For example, if the polarizing filter is configured to filter horizontally polarized light, the amount of light for display of the image intended to be displayed on the second side of the device 600 may be increased by adjusting the output polarization characteristic of the display device 602 to reduce the proportion of horizontally polarized light (which would be filtered by the polarizing filter) emitted by the display device 602. The output polarization characteristic for example indicates a polarization state of light emitted from the display device 602. The polarization state may indicate a polarization direction of e.g. linearly or circularly polarized light. The display device 602 may selectively filter light emitted therefrom such that the light has a particular polarization state. Adjusting the output polarization characteristic in the example of FIG. 6 includes adjusting a polarization modulator 648 configured to modulate the polarization state of light emitted from the display device 602, and transmitted therethrough. In this case, the polarization modulator 648 is illustrated as a separate component from the display device 602. However, in other examples, the polarization modulator 648 may be integrated with the display device 602. The polarization modulator in the example of FIG. 6 is an electro-optical device, although this is merely an example. An electro-optical polarization modulator typically has fewer moving parts than a mechanical polarization modulator, and thus is generally less prone to errors, misalignment and/or deterioration over time. The at least one processor 636 may be configured to control the polarization modulator 648 to perform one or more of actuating, activating, de-activating, adjusting and changing a state of the polarization modulator 648. For example, the at least one processor 636 may cause a voltage to be applied to the polarization modulator 648 to drive the polarization modulator 648. As such, the at least one processor 636 is operable to change the polarization state of light emitted from the display device 602. For example, light emitted from the display device 602 may have a first polarization state prior to the polarization modulator 648 being driven, and then a second polarization state subsequently. In other examples, adjusting the output polarization characteristic includes adjusting a polarization rotator, to rotate the polarization axis of linearly polarized light emitted from the display device 602. In some examples, adjusting the output polarization characteristic causes initially unpolarized light having been emitted from the display device 602 to be polarized. In further examples, adjusting the output polarization characteristic causes the polarization state of initially polarized light having been emitted from the display device 602 to change. For example, the adjusting the output polarization characteristic of the display device 602 may cause the polarization direction of linearly polarized light to be modulated by 90 degrees.

As noted above, the at least one further sensor 642 in FIG. 6 includes a camera 646 (although in other cases, a device similar to the device 600 of FIG. 6 may include at least one further sensor including more, fewer or different sensors than those shown in FIG. 6). The camera 646, which maybe referred to as an image capture device, is operable to obtain still images or moving images (i.e. video) of the environment, and is therefore operable to capture an observation of the environment. In this case, the environmental data may represent at least one observation of the environment captured by the camera 646, e.g. in the form of image data representative of at least one image of the environment, or video data representative of at least one video of the environment. In this case, the at least one processor 636 is configured to control the display of the image based on the at least one observation of the environment obtained using the camera 646. For example, rather than determining the luminance of the ambient light using the photosensor 644, the at least one processor 636 may instead determine the luminance of the ambient light based on the observation of the environment from the camera 646, e.g. by processing the data obtained by the camera 646.

In some cases in which the environmental data represents at least one observation of the environment captured by the camera 646, the at least one processor 636 is configured to process the environmental data to identify a predetermined object in the environment. The predetermined object may be an inanimate object, such as furniture, or a living creature, such as a person or a particular person. To identify the predetermined object, data obtained by the camera 646 representing the at least one observation of the environment may be processed using an object detection and/or recognition process. In such cases, the at least one processor 636 may be configured to implement computer vision (CV) functionality to perform object detection and/or recognition. CV functionality may include other tasks such as motion estimation, scene reconstruction or image restoration. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment. Performing object detection and/or recognition may involve the use of one or more trained artificial neural networks (ANNs). Using an ANN to perform object detection and/or recognition may increase an accuracy and/or reliability of object detection and/or recognition compared to some known techniques. An ANN may be trained to detect and locate objects in an image, and/or to classify those objects using a plurality of predefined object classes or types. The identification of the predetermined object may be performed by a CV engine of the at least one processor 636, which is a dedicated processor for implementing CV functionality. The CV engine may be comprised by a central processing unit (CPU) or GPU of the at least one processor 636 or may be a separate processing component. In other examples, CV functionality is performed by a processor of the at least one processor 636 that is not dedicated to CV functionality, such as a CPU or GPU.

The display of the image may then be controlled by the at least one processor 636 based on the predetermined object identified by processing the environmental data. In this way, the device 600 may be controlled to display an image intended to be displayed on the second side of the device 600 with appropriate characteristics for a given environment, which may be detected by the presence of the predetermined object in the environment. In other cases, the device 600 is controlled to display an image intended to be displayed on the second side of the device 600 for a given audience, as determined by the presence of the predetermined object in the environment (e.g. where the predetermined object is a particular person or group of people). For example, the at least one processor 636 may control the device 600 to display different respective images to different respective people or may display an image which matches or complements the environment. For example, if it is determined that the environment includes a tree, i.e. if the predetermined object is a tree, the device 600 may be controlled to display an image of trees on the second side of the device 600.

In further examples, the at least one processor 636 is configured to identify a change in the at least one feature of the environment, based on the environmental data, and to control the display device 602 to cease the display of the image and to display a different image intended to be displayed on the second side of the device 600. This allows the device 600 to be controlled to automatically display an image that is appropriate for a given environment.

As discussed above, the environmental data may represent a luminance of ambient light and/or an observation of the environment. These are merely examples, though, and in other examples the environmental data may instead or in addition represent another feature of the environment, such as a location, a date and/or a time of day.

In the example of FIG. 6, the device 600 also includes a user interface 650 configured to receive user data indicative of a user request to change at least one property of the image. The user interface 650 may be any suitable interface for receiving the user data, such as an interface for receiving tactile input, e.g. a button, roller or switch. In other cases, the user interface may be or include an interface for receiving the user data, such as an input/output (I/O) interface, such as a universal serial bus (USB) connection, a Bluetooth or infrared connection, or a data network, for example a computer network such as the Internet, a local area network, a wide area network, a telecommunications network, a wired network, a wireless network, or some other type of network. In such cases, the user data may be generated remotely from the device 600 and subsequently received by the user interface 650 of the device 600. In FIG. 6, the at least one processor 636 is configured to process image data representative of the image to change the at least one property of the image, based on the user data, thereby generating an updated image. The at least one processor 636 is further configured to control the display device 602 to display the updated image. This further improves the flexibility of the display 600, by allowing the user to control the display of the image themselves, e.g. in response to a change in the user's environment or mood.

The components of the device 600 in the example of FIG. 6 are interconnected using a systems bus 652. This allows data to be transferred between the various components. The bus 652 may be or include any suitable interface or bus. For example, an ARM® Advanced Microcontroller Bus Architecture (AMBA®) interface, such as the Advanced eXtensible Interface (AXI), may be used.

Figure 7:
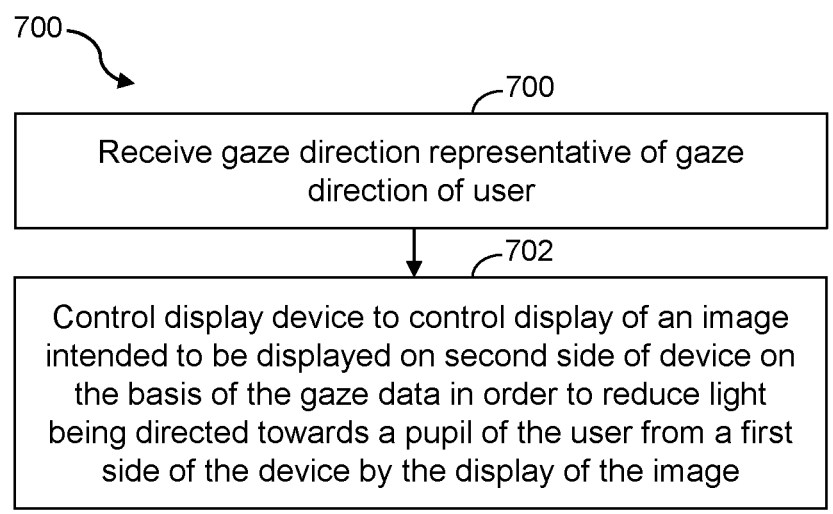
FIG. 7 is a schematic diagram illustrating a method according to examples herein.

FIG. 7 is a schematic diagram illustrating a method 700 according to examples herein. The method 700 of FIG. 7 may be implemented using the devices described herein, or with other devices that include a first side for facing a user of the user and a second side opposite to the first side. In an example, at least one portion of the method 700 is implemented by executable code, stored on a non-transitory storage medium, that includes instructions, that when executed by at least one processor, causes the at least one processor to perform the at least one portion of the method 700 described herein. In another case, at least one portion of the method 700 is implemented by at least one ASIC. The ASIC may be standard, fully customized or partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a RAM, a ROM, an erasable programmable read-only memory, or a portable disc.

Item 702 of the method 700 includes receiving gaze data representative of a gaze direction of the user. Item 704 of the method 700 includes controlling a display device of the device to control display of an image intended to be displayed on the second side of the device on the basis of the gaze data in order to reduce light being directed towards a pupil of the user from the first side of the device by the display of the image. In this way, as described with reference to FIG. 2, the device may be operated in a flexible manner, with improved functionality compared to a device which is not configured to display a desired image on the second side of the device.

Further examples are envisaged. In the examples described above with reference to FIGS. 1 and 2, the devices 100, 200 include a waveguide 110, 210 configured to guide light emitted from the display device 102, 202 towards a user at a first side of the device and/or towards a second side of the device opposite to the first side. However, in other examples, devices otherwise similar to the devices 100, 200 of FIGS. 1 and 2 need not include a waveguide or may include a differently arranged waveguide or waveguides. The devices 100, 200 of FIGS. 1 and 2 include a single waveguide, which can display images intended to be displayed on the second side of the devices 100, 200 due to leakage of light from the single waveguide. In other cases, though, devices configured to provide a similar function, e.g. display of an image intended to be displayed on the second side of the device and/or an image intended to be displayed on the first side of the device, may include two waveguides. Such displays may be referred to as dual waveguide displays, and typically include an inward facing waveguide for directing light towards the first side of the device, e.g. to display a second image to the user on the first side of the device, and an outward facing waveguide for directing light towards the second side of the device, e.g. to display a first image to a bystander located on the second side of the device. In this way, different images may be displayed on the inward and outward facing surfaces of the device. In such cases, at least one processor of the device may independently control the display of the first and/or second images appropriately, which may be based on environmental data, user input and/or other input. In other cases, light emanating from a display device of such a device may be emitted from the first and/or second side of the device without use of a waveguide, e.g. by use of a different optical arrangement. Furthermore, while a HMD is given as a suitable example of a devices in examples herein, in other cases, the devices herein need not be or comprise a HMD. For example, such a device may be mountable on another part of a user's body or need not be user-mountable.

In the example of FIG. 6, the device 600 includes a photosensor 644, a camera 646, a polarization modulator 648 and a user interface 650. In further examples at least one of these components may be omitted. Indeed, it is to be appreciated that devices in accordance with examples herein may include any combination of these components or may include none of these components. Furthermore, in FIG. 6, the at least one processor 636 is configured to control the display of the image intended to be displayed on the second side of the device 600 based on either the environmental data and/or the user data. However, in other cases, at least one processor of a device otherwise similar to the device 600 of FIG. 6 may be configured to control the display of the image intended to be displayed on the second side of the device based on solely one of the environmental data or the user data, or based on neither environmental data or user data. Instead, the display of the image intended to be displayed on the second side of the device may be controlled merely based on image data representative of the image.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A device comprising:
a first side for facing a user of the device;
a second side opposite to the first side;
a sensor operable to output gaze data representative of a gaze direction of the user;
a display device; and at least one processor configured to control the display device to:
  control display of an image intended to be displayed on the second side of the device;
  identify, on the basis of the gaze data, a first plurality of pixels of the display device for displaying the image; and
  control display of the image, on the basis of the identified first plurality of pixels, in order to reduce light being directed towards a pupil of the user from the first side of the device by the display of the image.

2. The device according to claim 1, wherein the at least one processor is configured to control the display of the image such that a first amount of light directed towards the pupil of the user from the first side of the device by the display of the image is less than a second amount of light emanating from the second side of the device.

3. The device according to claim 1, wherein the at least one processor is configured to control the display of the image such that a first amount of light directed towards the pupil of the user from the first side of the device by the display of the image is less than a further amount of light directed away from the pupil of the user from the first side of the device by the display of the image.

4. The device according to claim 1, wherein the at least one processor is configured to
  control display device to display the image using the first plurality of pixels of the display device, without using a second plurality of pixels of the display device, different from the first plurality of pixels.

5. The device according to claim 4, wherein the at least one processor is configured to:
  determine a change in the gaze direction of the user; and
  in response to the change in the gaze direction, select a different plurality of pixels of the display device as the first plurality of pixels.

6. The device according to claim 1, comprising a further sensor configured to obtain environmental data representative of at least one feature of an environment of the device, wherein the at least one processor is configured to control the display of the image based on the environmental data.

7. The device according to claim 6, wherein the further sensor comprises a photosensor and the environmental data represents a luminance of ambient light detected by the photosensor.

8. The device according to claim 6, wherein the device comprises a polarizing filter and the at least one processor is configured to control the polarizing filter to selectively filter light emitted by the display device during the display of the image intended to be displayed on the second side of the device, based on the environmental data.

9. The device according to claim 6, wherein the further sensor comprises a camera and the environmental data represents at least one observation of the environment captured by the camera.

10. The device according to claim 9, wherein the at least one processor is configured to:
  process the environmental data to identify a predetermined object in the environment; and
  control the display of the image based on the predetermined object identified by processing the environmental data.

11. The device according to claim 6, wherein the at least one processor is configured to control at least one of: a dynamic range of the display device, an intensity of a backlight of the display device, or a color profile of the display device based on the environmental data.

12. The device according to claim 6, wherein the at least one processor is configured to control a color characteristic of the image based on the environmental data.

13. The device according to claim 6, wherein the at least one processor is configured to:
  identify a change in the at least one feature of the environment, based on the environmental data; and,
  in response, control the display device to cease the display of the image and to display a different image intended to be displayed on the second side of the device.

14. The device according to claim 1, comprising a user interface configured to receive user data indicative of a user request to change at least one property of the image, wherein the at least one processor is configured to:
  process image data representative of the image to change the at least one property of the image, based on the user data, thereby generating an updated image; and
  control the display device to display the updated image.

15. The device according to claim 1, wherein the at least one processor is configured to control the display device to control the display of the image such that at least one property of the image is time-varying.

16. The device according to claim 1, wherein the device is a head mounted display (HMD).

17. The device according to claim 1, comprising a waveguide configured to:
  receive light emitted from the display device during the display of the image; and
  guide the light emitted from the display device such that the image is displayed on the second side of the device.

18. A method of controlling a device comprising a first side for facing a user of the device and a second side opposite to the first side, the method comprising:
  receiving gaze data representative of a gaze direction of the user; and
  controlling a display device of the device to:
    control display of an image intended to be displayed on the second side of the device;
    identify, on the basis of the gaze data, a first plurality of pixels of the display device for displaying the image; and
    control the display of the image, on the basis of the identified first plurality of pixels, in order to reduce light being directed towards a pupil of the user from the first side of the device by the display of the image.

* * * * *